United States Patent
Hayano

(10) Patent No.: US 9,922,296 B2
(45) Date of Patent: Mar. 20, 2018

(54) DISTRIBUTION APPARATUS, DISTRIBUTION METHOD, AND RECORDING MEDIUM

(71) Applicant: Hideaki Hayano, Kanagawa (JP)

(72) Inventor: Hideaki Hayano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 562 days.

(21) Appl. No.: 14/474,371

(22) Filed: Sep. 2, 2014

(65) Prior Publication Data

US 2015/0081354 A1    Mar. 19, 2015

(30) Foreign Application Priority Data

Sep. 13, 2013  (JP) .................................. 2013-190368

(51) Int. Cl.
G06Q 10/06 (2012.01)
G06Q 10/10 (2012.01)

(52) U.S. Cl.
CPC .......... G06Q 10/063 (2013.01); G06Q 10/10 (2013.01)

(58) Field of Classification Search
CPC ......... G06Q 10/00; G06Q 40/06; G06F 17/60
USPC ....................................................... 705/7.11
See application file for complete search history.

(56) References Cited

U.S. PATENT DOCUMENTS

| | | | |
|---|---|---|---|
| 8,179,542 B2 | 5/2012 | Yagi | |
| 8,904,516 B2 * | 12/2014 | Larson | H04L 29/12066 713/150 |
| 9,038,163 B2 * | 5/2015 | Larson | H04L 29/12066 726/15 |
| 9,077,694 B2 * | 7/2015 | Larson | H04L 29/12066 |
| 9,094,399 B2 * | 7/2015 | Larson | H04L 29/12216 |
| 2006/0224402 A1 * | 10/2006 | Hanna | G06Q 10/06 705/34 |
| 2009/0044104 A1 * | 2/2009 | Hashimoto | G06Q 10/10 715/254 |

(Continued)

FOREIGN PATENT DOCUMENTS

| | | |
|---|---|---|
| JP | 2007-208448 | 8/2007 |
| JP | 2008-097586 | 4/2008 |
| JP | 2008-288810 | 11/2008 |

OTHER PUBLICATIONS

Japanese Office Action for 2013-190368 dated Jun. 13, 2017.

*Primary Examiner* — Romain Jeanty
(74) *Attorney, Agent, or Firm* — IPUSA, PLLC

(57) ABSTRACT

A distribution apparatus includes a reception part that receives first data and a request for execution of a process according to a process definition formed of one or more units of processing with respect to the first data, and one or more processing parts that execute the corresponding one or more units of processing. At least one processing part is a distribution part that distributes, to a distribution destination specified in the process definition, the first data or second data output as a result of execution of a unit of processing executed before a unit of processing corresponding to the at least one processing part. The distribution part distributes the first or second data based on information indicating a distribution method for the specified distribution destination defined in the process definition, when the specified distribution destination is included in multiple distribution destinations to which a communications protocol is common.

6 Claims, 11 Drawing Sheets

(56) References Cited

U.S. PATENT DOCUMENTS

| | | | | |
|---|---|---|---|---|
| 2009/0185219 A1* | 7/2009 | Yagi | ............... | G06Q 10/06 |
| | | | | 358/1.15 |
| 2012/0179504 A1* | 7/2012 | Nakashima | ............ | G06Q 10/06 |
| | | | | 705/7.14 |
| 2014/0365587 A1* | 12/2014 | Hayano | ............... | G06Q 10/107 |
| | | | | 709/206 |

* cited by examiner

FIG.5

```
<?xml version="1.0"?>
<Distribution>
    //DESCRIBE FLOW ID AND BIBLIOGRAPHIC INFORMATION USED
      IN THIS FLOW
    <ID>ApplicationFormFlow</ID>
    <LinkedPropertyScreen>ApplicationFormScreen</LinkedPropertyScreen>
    //DESCRIBE IMAGE CONVERSION PROCESS
    <Plugin>
        <PluginID>ImageConverter</PluginID>
        <PluginType>Filter</PluginType>
        <Parameters>
            <FileFormat>PDF</FileFormat>
        </Parameters>
        <Next>
            //DESCRIBE FOLDER DISTRIBUTION PROCESS EXECUTED
              AFTER IMAGE CONVERSION PROCESS
            <Plugin>
                <PluginID>ToCMIS</PluginID>
                <PluginType>Output</PluginType>
                <Parameters>
                            ⋮
                </Parameters>                                     ---410
            </Plugin>
        </Next>
    </Plugin>
    //DESCRIBE E-MAIL PROCESS EXECUTED IN PARALLEL
    <Plugin>
        <PluginID>ToEmail</PluginID>
        <PluginType>Output</PluginType>
        <Parameters>
            <SmtpServer>111.111.111.111</SmtpServer>
            <Sender>abc@xxx.yyy.com</Sender>
            <Subject>ApplicationForm{num}</Subject>                ——420
            <Body>SubmitApplicationTo{text1}</Body>                ——430
            <FileName>ApplicationForm{num}_{text1}</FileName>      ——440
            <Destinations>
                <Address>dest1@xxx.yyy.com</Address>
                <Address>dest2@xxx.yyy.com</Address>
            </Destinations>
        </Parameters>
    </Plugin>
</Distribution>
```

FIG.6

```
<Parameters>
    <Destination name="AAA" selected="true">
        <common>
            <url>http://aaa.com</url>
            <repository>repo1</repository>
            <username>aaa</username>
            <password>bbb</password>
                :
        </common>
        <individual>
            <class>ApplicationForm</class>
            <property1>{creator}</property1>
            <property2>{To}</property2>
            <property3>{createdate}</property3>
                :
        </individual>
    </Destination>                                          411
    <Destination name="BBB" selected="false">
        <common>
            <url>http://bbb.com</url>
            <repository>lib1</Repository>
            <username>ccc</username>
            <password>ddd</password>
                :
        </common>
        <individual>
            <type>ApplicationForm</type>
            <attribute1>{applicant}</attribute1>
            < attribute1 >{date}</ attribute1 >
            < attribute1 >{···}</ attribute1 >
                :
        </individual>
    </Destination>                                          412
    <Destination name="CCC" selected="false">
            :
    <Destination>                                           413
</Parameters>
```

410

DISTRIBUTION APPARATUS, DISTRIBUTION METHOD, AND RECORDING MEDIUM

CROSS-REFERENCE TO RELATED APPLICATION

The present application is based upon and claims the benefit of priority of Japanese Patent Application No. 2013-190368, filed on Sep. 13, 2013, the entire contents of which are incorporated herein by reference.

BACKGROUND OF THE INVENTION

1. Field of the Invention

The present invention relates to distribution apparatuses, distribution methods, and recording media.

2. Description of the Related Art

There is a system that distributes the data of a process result in a predefined workflow to distribution destinations according to the workflow with respect to the image data scanned in an image forming apparatus. (See, for example, Japanese Laid-Open Patent Application No. 2008-97586.) In such a system, a program module (hereinafter simply referred to as "module") is implemented for each unit of processing of the workflow in order to increase the latitude of the workflow. As a result, it is possible to define various workflows by combinations of modules.

SUMMARY OF THE INVENTION

According to an aspect of the present invention, a distribution apparatus includes a reception part configured to receive first data and a request for execution of a process according to a process definition formed of one or more units of processing with respect to the first data; and one or more processing parts each configured to execute a corresponding one of the one or more units of processing, wherein at least one of the one or more processing parts is a distribution part configured to distribute, to a distribution destination specified in the process definition, the first data or second data output as a result of execution of a first one of the one or more units of processing executed before a second one of the one or more units of processing corresponding to the at least one of the one or more processing parts, and wherein the distribution part is configured to distribute the first data or the second data based on information indicating a distribution method for the specified distribution destination defined in the process definition, when the specified distribution destination is included in a plurality of distribution destinations to which a communications protocol for data distribution is common.

According to an aspect of the present invention, a distribution method includes receiving, by a distribution apparatus, first data and a request for execution of a process according to a process definition formed of one or more units of processing with respect to the first data, the distribution apparatus including one or more processing parts each configured to execute a corresponding one of the one or more units of processing; and distributing, by at least one of the one or more processing parts, the first data or second data output as a result of execution of a first one of the one or more units of processing executed before a second one of the one or more units of processing corresponding to the at least one of the one or more processing parts, to a distribution destination specified in the process definition, wherein said distributing transmits the first data or the second data based on information indicating a distribution method for the specified distribution destination defined in the process definition, when the specified distribution destination is included in a plurality of distribution destinations to which a communications protocol for data distribution is common.

According to an aspect of the present invention, a non-transient computer-readable recording medium has stored therein a program for causing a computer to execute a process, the process including receiving first data and a request for execution of a process according to a process definition formed of one or more units of processing with respect to the first data; causing the computer to function as one or more processing parts each configured to execute a corresponding one of the one or more units of processing, wherein at least one of the one or more processing parts is a distribution part configured to distribute, to a distribution destination specified in the process definition, the first data or second data output as a result of execution of a first one of the one or more units of processing executed before a second one of the one or more units of processing corresponding to the at least one of the one or more processing parts; and distributing, by the distribution part, the first data or the second data based on information indicating a distribution method for the specified distribution destination defined in the process definition, when the specified distribution destination is included in a plurality of distribution destinations to which a communications protocol for data distribution is common.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 5 is a diagram illustrating a description of flow definition data;

FIG. 6 is a diagram illustrating a definition of a <Parameters> element related to a CMIS distribution process;

DETAILED DESCRIPTION OF THE PREFERRED EMBODIMENTS

In a system where a module is implemented for each unit of processing of the workflow as mentioned above, a module that performs distribution needs to be implemented distribution destination by distribution destination. This is because the distribution method is different for each distribution destination, so that a module that performs distribution according to the distribution method of a corresponding distribution destination has to be implemented with respect to each distribution destination. Accordingly, for a new distribution destination, a module corresponding to the new distribution destination has to be implemented.

According to an aspect of the present invention, it is possible to reduce operational load in accommodating multiple distribution destinations.

Figure 1:
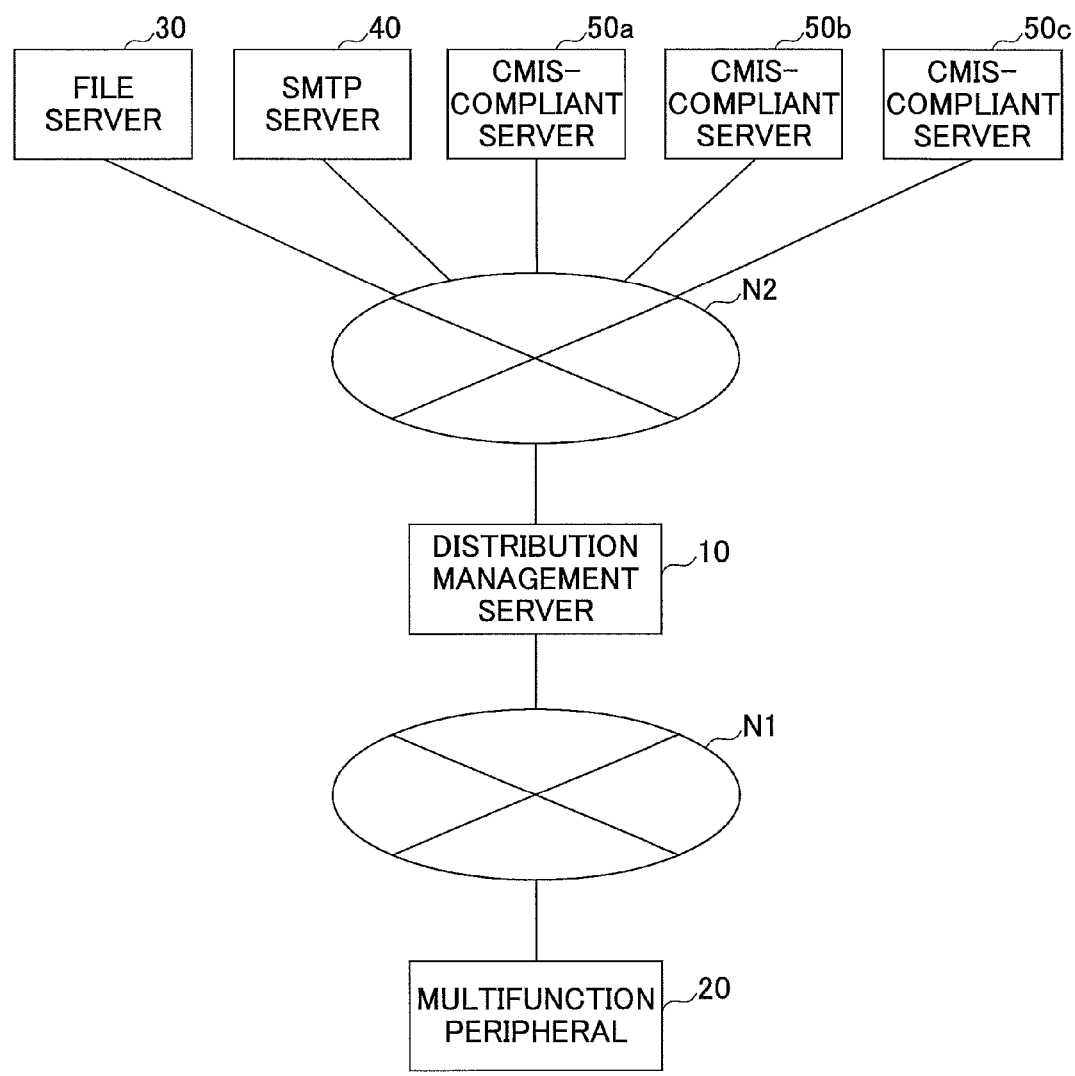
FIG. 1 is a diagram illustrating a configuration of a distribution management system according to an embodiment.

A description is given below, with reference to the accompanying drawings, of embodiments of the present invention. FIG. 1 is a diagram illustrating a configuration of a distribution management system according to an embodiment. Referring to FIG. 1, a distribution management system 1 includes a distribution management server 10, at least one multifunction peripheral 20, a file server 30, a Simple Mail Transfer Protocol (SMTP) server 40, and Content Management Interoperability Services (CMIS)-compliant servers 50a, 50b and 50c. The distribution management server 10 is connected to the multifunction peripheral 20 via a network N1 such as a local area network (LAN) or wide area network (WAN). Furthermore, the distribution management server 10 is connected to the file server 30, the SMTP server 40, and the CMIS-compliant servers 50a through 50c via a network N2 such as a LAN or WAN. The network N1 and the network N2 may be the same network.

The multifunction peripheral 20 is an image forming apparatus that implements two or more of a scanning function, a copying function, a printing function and a facsimile function in a single enclosure. In this embodiment, the multifunction peripheral 20 generates image data by scanning a medium such as a paper medium using a scanning function, and transmits the generated image data to the distribution management server 10. A scanner that implements only a scanning function may be used in place of the multifunction peripheral 20.

The distribution management server 10 is a computer that receives image data scanned in the multifunction peripheral 20 and executes a process flow such as a workflow with respect to the image data as an object of processing in accordance with the flow definition data described below. The workflow refers to a combination of two or more ordered units of processing. Each unit of processing is referred to as "activity." By combining activities as desired, it is possible to define a desired workflow. The workflow may be a single unit of processing.

The file server 30, the SMTP server 40, and the CMIS-compliant servers 50a through 50c are candidate distribution destinations of data that are output as a result of execution of a workflow by the distribution management server 10.

The file server 30 is a computer that stores and manages files shared on the network N2. The SMTP server 40 is a computer that transmits electronic mail (e-mail) in compliance with SMTP that is a protocol for e-mail transmission. The CMIS-compliant servers 50a through 50c are document management servers that include an interface compliant with the CMIS standard. CMIS is a specification related to the interoperation of content management systems developed by the Organization for the Advancement of Structured Information Standards (OASIS), which is a standard consortium. CMIS-compliant document management servers provide a common method that may be called by the Representational State Transfer (REST) or the Simple Object Access Protocol (SOAP). Therefore, according to this embodiment, the distribution management server 10 may access the CMIS-compliant servers 50a through 50c through a common communications protocol and a common method. According to this embodiment, however, the CMIS-compliant servers 50a through 50c have respective different document management systems (attribute items managed with respect to documents). Hereinafter, the CMIS-compliant servers 50a through 50c may be collectively referred to "CMIS-compliant servers 50" where there is no particular need to make a distinction between the CMIS-compliant servers 50a through 50c.

Figure 2:
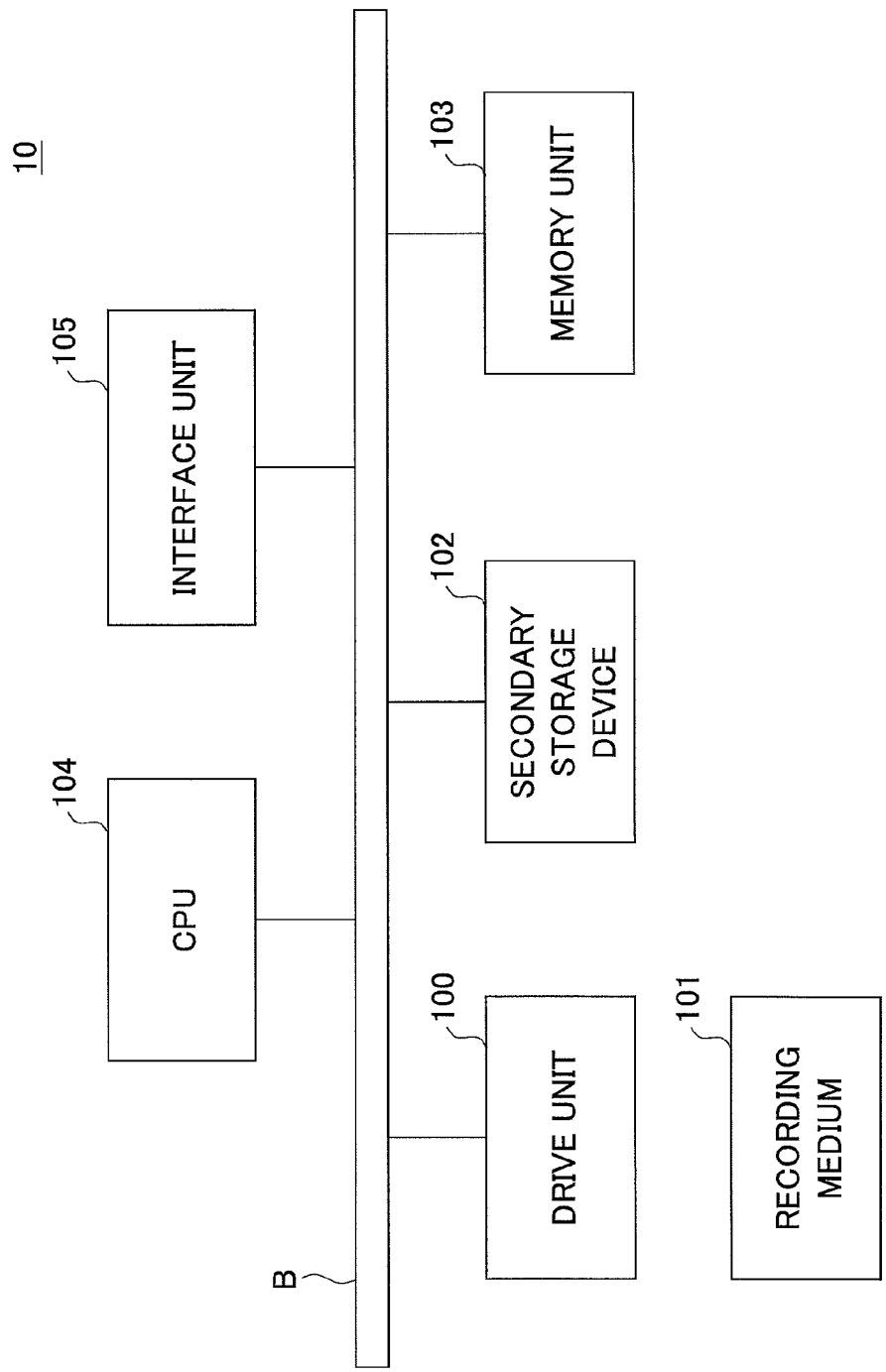
FIG. 2 is a diagram illustrating a hardware configuration of a distribution management server according to an embodiment.

FIG. 2 is a diagram illustrating a hardware configuration of a distribution management server according to an embodiment. Referring to FIG. 2, the distribution management server 10 includes a drive unit 100, a secondary storage device 102, a memory unit 103, a central processing unit (CPU) 104, and an interface unit 105, all of which are interconnected by a bus B.

A program that implements processes in the distribution management server 10 is provided by way of a recording medium 101 such as a CD-ROM. When the recording medium 101 in which a program is stored is loaded into the drive unit 100, the program is installed in the secondary storage device 102 via the drive unit 100. A program, however, does not necessarily have to be installed from the recording medium 101, and may be downloaded from another computer via a network. The secondary storage device 102 stores files and data as well as installed programs.

The memory unit 103 reads a program from the secondary storage device 102 and stores the read program in response to an instruction to activate the program. The CPU 104 executes a function pertaining to the distribution management server 10 in accordance with a program stored in the memory unit 103. The interface unit 105 is used as an interface for connecting to a network.

The distribution management server 10 may alternatively be implemented by multiple computers each having hardware as illustrated in FIG. 2.

As a further alternative, the multifunction peripheral 20 may also serve as the distribution management server 10. That is, the multifunction peripheral 20 may have a functional configuration as illustrated in FIG. 3.

Figure 3:
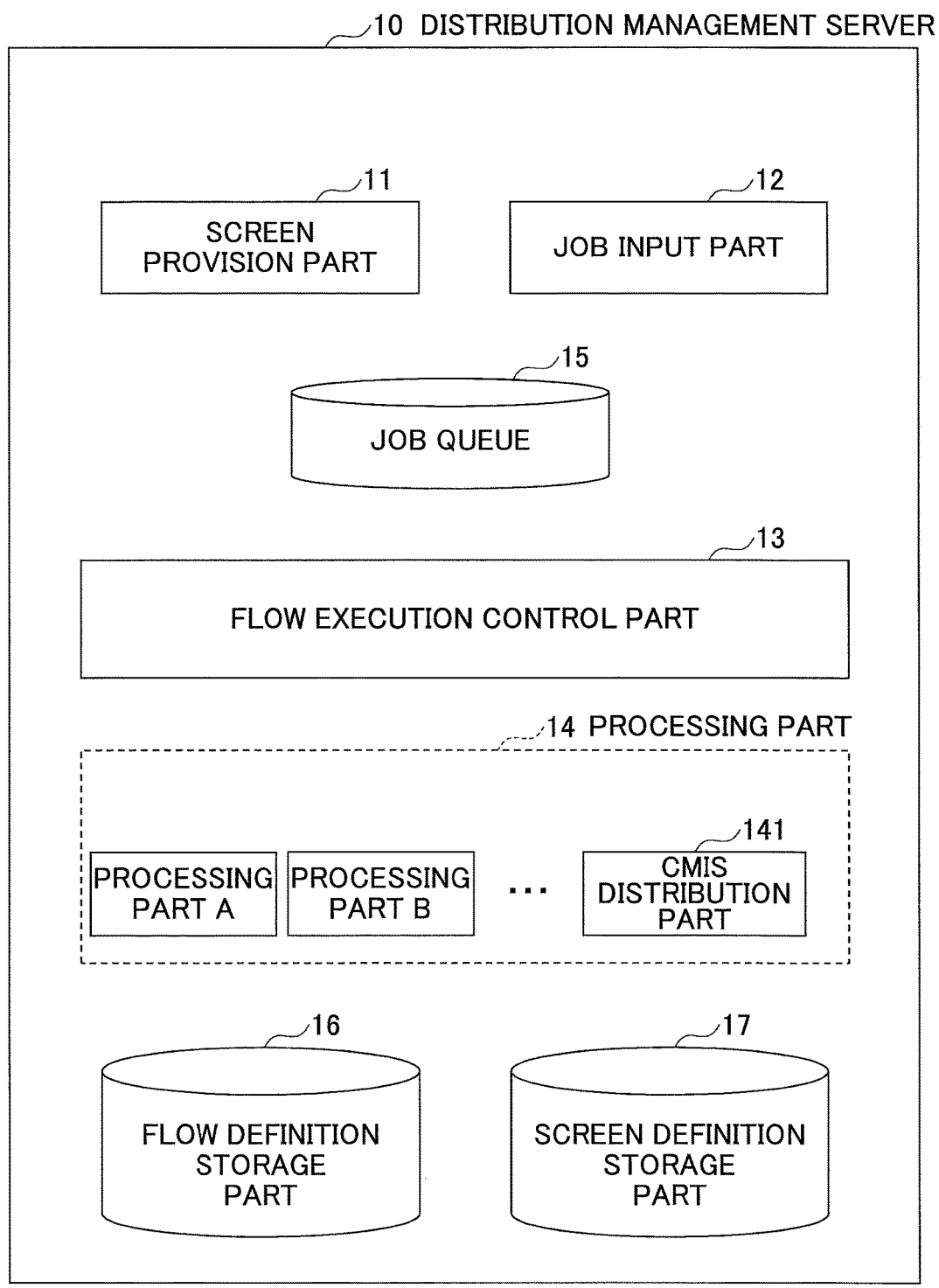
FIG. 3 is a diagram illustrating a functional configuration of a distribution management server according to an embodiment.

FIG. 3 is a diagram illustrating a functional configuration of a distribution management server according to an embodiment. Referring to FIG. 3, the distribution management server 10 includes a screen provision part 11, a job input part 12, a flow execution control part 13, and a processing part 14. These parts 11 through 14 are implemented by processes that a program installed in the distribution management server 10 causes the CPU 104 to execute. Furthermore, the distribution management server 10 uses storage parts such as a job queue 15, a flow definition storage part 16, and a screen definition storage part 17. These storage parts 15 through 17 may be implemented using the secondary storage device 102 or a storage device connected to the distribution management server 10 via a network. The memory unit 103 may be used for the job queue 15.

The flow definition storage part 16 stores flow definition data. The flow definition data refer to data where definition information regarding process flows of workflows is recorded. According to this embodiment, one item of flow definition data corresponds to one workflow.

The screen definition storage part 17 stores screen definition data. The screen definition data refer to data where definition information regarding configurations of screens for receiving inputs of setting values for workflows is recorded. According to this embodiment, one item of screen definition data corresponds to one screen. Furthermore, the screen definition data are stored in correlation with the flow definition data of corresponding workflows. According to this embodiment, the identification information of screen definition data is recorded in corresponding flow definition data, so that the flow definition data and the screen definition data are correlated.

The screen provision part 11 provides the multifunction peripheral 20 with the screen definition data. The job input part 12, in response to a request for execution of a workflow from the multifunction peripheral 20, inputs job information pertaining to the workflow in the job queue 15. According to this embodiment, a job refers to a unit of execution of a workflow. For example, when the same workflow is executed multiple times, the job is different each time.

The job queue 15 stores input job information. The job information includes, for example, the identifier of a workflow to be executed, setting values for the workflow, and data to be processed.

The flow execution control part 13 obtains job information from the job queue 15, and controls execution of a workflow in accordance with the definition of flow definition data pertaining to the job information.

The processing part 14 executes a process on the basis of a unit of processing (activity) of a workflow. For example, one activity is implemented by a single processing part 14. Accordingly, a workflow is implemented by a process by a single processing part 14 or a connection of processes by two or more processing parts 14 whose contents of processing are different from each other. For simplification, in FIG. 3, multiple processing parts, which, by way of example, include a processing part A, a processing part B, and a CMIS distribution part 141, are collectively illustrated as the processing part 14. In the following description, individual processing parts may also be referred to by reference numeral "14." The individual processing parts 14 may be implemented by program modules independent of each other. In this case, each program module may be easily installable as a plug-in. In the following description, one program that causes the distribution management server 10 to function as a single processing part 14 is referred to as "plug-in." Here, the "one program" is not limited to, for example, a program configured of a single executable file. The "one program" may be configured of one executable file and one or more library files used from the executable file. That is, technically, the "one program" refers to one program logic.

A description is given in more detail of the flow definition data. According to this embodiment, individual units of processing forming a workflow are roughly divided into intermediate processes and output processes. Intermediate processes are, for example, the processing of image data received from the multifunction peripheral 20. Examples of intermediate processes include a noise eliminating process, an optical character recognition (OCR) process, a translation process, and a data conversion process. Hereinafter, a plug-in that causes the distribution management server 10 to function as the processing part 14 to execute an intermediate process is referred to as "intermediate plug-in." The intermediate plug-in is implemented processing type by processing type. Accordingly, by installing an intermediate plug-in that causes the distribution management server 10 to execute new processing, it is possible to construct a workflow using the new processing.

Output processes are the outputting of image data received from the multifunction peripheral 20 or data output from an intermediate process. Examples of output processes include distribution of data to the multifunction peripheral 20 that is a scanning source, the multifunction peripheral 20 different from the multifunction peripheral 20 that is a scanning source, the file server 30, the SMTP server 40, or one or more of the CMIS-compliant servers 50. When the SMTP server 40 is a distribution destination, data output from a workflow are transmitted by e-mail. Data are transmitted to each of the CMIS-compliant servers 50 by a method compliant with CMIS. Hereinafter, a plug-in that causes the distribution management server 10 to function as the processing part 14 to execute an output process is referred to as "output plug-in." Basically, the output plug-in is implemented distribution destination by distribution destination. That is, different processing parts 14 exist for different distribution destinations. This is because the data distribution method and the data management system differ between distribution destinations. According to this embodiment, however, the distribution of data to the CMIS-compliant servers 50 is implemented by one output plug-in (that is, a single processing part 14). The CMIS-compliant servers 50 have a common interface, so that basically, it is possible to access the CMIS-compliant servers 50 with a common logic. The CMIS distribution part 141 illustrated in FIG. 3 is a processing part 14 that executes distribution of data to the CMIS-compliant servers 50. An output plug-in that causes the distribution management server 10 to function as the CMIS distribution part 141 is referred to as "CMIS distribution plug-in."

According to this embodiment, while distribution is described as one mode of output, an output process by another mode of output, such as printing, may form a workflow.

The flow definition data include the definition of an ordered combination of at least one output process and one or more intermediate processes as required. A workflow may be defined so that process branches are executed in parallel.

Figure 4:
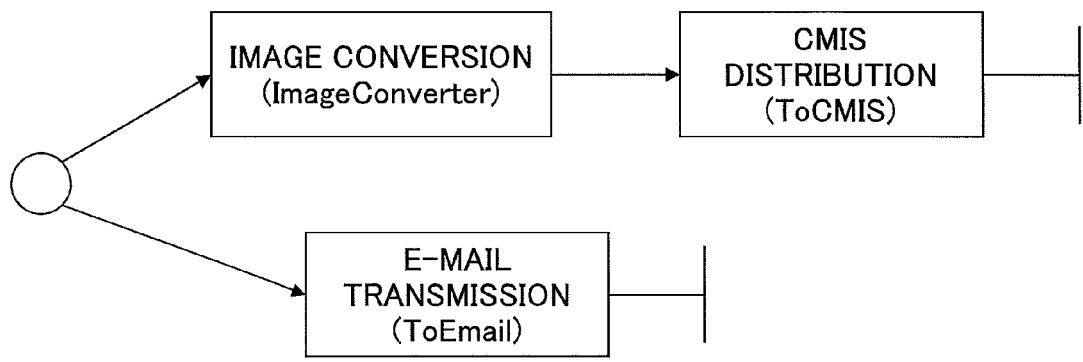
FIG. 4 is a schematic diagram illustrating a workflow.

FIG. 4 is a schematic diagram illustrating a workflow. FIG. 4 illustrates a workflow related to a process of distributing image data read from an application form (hereinafter referred to as "application form flow"). The application form flow illustrates that an image conversion process with respect to image data scanned from the document of an application form is followed by a process of distributing the image data subjected to the image conversion process to the CMIS-compliant servers 50 (hereinafter referred to as "CMIS distribution process"). FIG. 4 also illustrates that a process of transmitting the scanned image data by e-mail is executed in parallel with the above-described process.

An OCR process may be executed before the CMIS distribution process. In this case, the data to be distributed may be text data that are output as a result of the OCR process or the text data and the scanned image data. Alternatively, the image conversion process before the CMIS distribution process may be omitted. In this case, the image data received from the multifunction peripheral 20 are to be distributed. Furthermore, a workflow that is different from the workflow illustrated in FIG. 4 may be defined by a combination of other processing parts 14 (other plug-ins).

The flow definition data of the application form flow illustrated in FIG. 4 are described, for example, as illustrated in FIG. 5.

FIG. 5 is a diagram illustrating a description of flow definition data. The flow definition data illustrated in FIG. 5 are described in XML (eXtensible Markup Language) format. The flow definition data may also be described in other format. In the following description, the area from a start tag to an end tag is referred to as "element." The name of the element is identical to the name of the tags. For example, an element whose tag name is "XXX" is referred to as "XXX element." Furthermore, the content defined between the start tag and the end tag is referred to as "value" of the element.

Flow definition data with respect to one workflow have a <Distribution> element as a root element. The <Distribution> element includes an <ID> element, a <LinkedPropertyScreen> element, and one or more <Plugin> elements as child elements.

The value of the <ID> element indicates a flow ID that is identification information assigned workflow by workflow. Each workflow is identified by the flow ID. The value of the <LinkedPropertyScreen> element indicates the identification information of screen definition data (hereinafter referred to as "screen definition ID") correlated with the flow definition data. Each <Plugin> element corresponds to a unit of processing (activity) forming the workflow.

One <Plugin> element includes a <PluginID> element, a <PluginType> element, and a <Parameters> element.

The value of the <PluginID> element indicates the identification information of a plug-in (hereinafter referred to as "plug-in ID") that causes the distribution management server 10 to execute a unit of processing pertaining to the <Plugin> element. Referring to FIG. 5, there are a <PluginID> element whose value is "ImageConverter", a <PluginID> element whose value is "ToCMIS" and a <PluginID> element whose value is "ToEmail", where "ImageConverter" is the plug-in ID of an intermediate plug-in that causes the distribution management server 10 to execute an image conversion process, "ToCMIS" is the plug-in ID of the CMIS distribution plug-in, and "ToEmail" is the plug-in ID of an output plug-in that causes the distribution management server 10 to execute an e-mail transmission process. One plug-in corresponds to one processing part 14. Accordingly, the plug-in ID may also be the identification information of an individual processing part 14.

The value of the <PluginType> element indicates whether a unit of processing corresponding to the <Plugin> element is an intermediate process or an output process, where "Filter" indicates an intermediate process and "OutPut" indicates an output process.

The <Parameters> element includes a child element that employs the name of a parameter (setting) for a unit of processing as a tag name. In the case of a unit of processing that includes multiple parameters, multiple child elements are included in the <Parameters> element. In elements 420, 430 and 440, a setting value input at the time of execution of the workflow is put in the space delimited by braces ({ }).

A <Plugin> element corresponding to a unit of processing followed by another unit of processing as in the image conversion process illustrated in FIG. 4 further includes a <Next> element as a child element.

The <Next> element includes a <Plugin> element corresponding to the following unit of processing as a child element. That is, the order of units of processing is defined by nesting a <Plugin> element through the <Next> element.

In the case illustrated in FIG. 5, the <Distribution> element has two <Plugin> elements corresponding to the image conversion process and the e-mail transmission process as child elements. That is, it is defined that these two units of processing are executed in parallel. The <Plugin> element corresponding to the image conversion process includes a <Next> element. The <Next> element includes a <Plugin> element corresponding to the CMIS distribution process as a child element. That is, it is defined that the CMIS distribution process is executed after the image conversion process.

For convenience of description, the details of the definition of a <Parameters> element 410 related to the CMIS distribution process are illustrated in FIG. 6.

FIG. 6 is a diagram illustrating a definition of a <Parameters> element related to a CMIS distribution process. Referring to FIG. 6, the <Parameters> element of the CMIS distribution process includes one or more <Destination> elements as child elements. In the case of FIG. 6, three <Destination> elements 411, 412 and 413 are included. The <Destination> elements 411, 412 and 413 are definitions corresponding to the CMIS-compliant server 50a, 50b and 50c, respectively. That is, one <Destination> element is a definition related to one distribution destination.

Each <Destination> element has a "name" attribute and a "selected" attribute. The value of the "name" attribute is the identification name (identifier) of the CMIS-compliant server 50 corresponding to the <Destination> element. The value of the "selected" attribute is information indicating whether the CMIS-compliant server 50 corresponding to the <Destination> element is selected as a distribution destination. The value of the "selected" attribute may be changed by a user's operation at the time of execution of the workflow. In FIG. 6, it is indicated that the CMIS-compliant server 50a corresponding to the <Destination> element 411 is selected as a distribution destination as a default (an initial or preset value).

Each <Destination> element includes a <common> element and an <individual> element as child elements. The <common> element and the <individual> element are examples of information indicating a method of distributing data to the CMIS-compliant server or information necessary for the distribution.

The value of the <common> element is a definition related to a group of items common to the CMIS-compliant servers 50. Referring to FIG. 6, each <common> element includes a <repository> element, a <username> element, and a <password> element as child elements. These child elements correspond to a group of items common to the CMIS-compliant servers 50. The value of the <repository> element is the identification information of the repository of a distribution destination. The repository corresponds to the highest-level concept in the CMIS data model. The <username> element and the <password> element are a username and a password that are required to log on to the corresponding CMIS-compliant server 50, respectively. The term "group of common items" means that the composition of items is common, and does not require the same values for individual items.

On the other hand, the <individual> element is a definition related to a group of items determined CMIS-compliant server 50 by CMIS-compliant server 50. The value of the <individual> element is principally information that indicates the composition of the attribute items of a document (that is, a data structure for managing a document) in the corresponding CMIS-compliant server 50. For example, the <Destination> element 411 includes <individual> elements such as a <class> element, a <property1> element, a <property2> element, and a <property3> element. The value of the <class> element is the identification name (identifier) of the type (class) of a data storage destination. The composition of attribute items differs from type to type. Each of the <property1> element, the <property2> element, and the <property3> element indicates an attribute item to be recorded in the CMIS-compliant server 50a with respect to data corresponding to the application form.

Furthermore, the <Destination> element 412 includes <individual> elements such as a <type> element, an <attribute1> element, an <attribute2> element, and an <attribute3> element. The value of the <type> element is a concept corresponding to the above-described value of the <class> element. Each of the <attribute1> element, the <attribute2> element, and the <attribute3> element indicates an attribute item to be recorded in the CMIS-compliant server 50b with respect to data corresponding to the application form.

FIG. 6 illustrates a case where three <Destination> elements corresponding to the three CMIS-compliant servers 50 are included in the <Parameters> element 410. If, however, it is desired to, for example, make only one or two of the CMIS-compliant servers 50 optional distribution destinations in the application form flow, the <Parameters> element may include only one or two <Destination> elements that correspond to the one or two of the CMIS-compliant servers 50. Furthermore, when it is desired to add a new CMIS-compliant server as an optional distribution destination, a <Destination> element corresponding to the new CMIS-compliant server may be added to the <Parameters> element 410.

Figure 7:
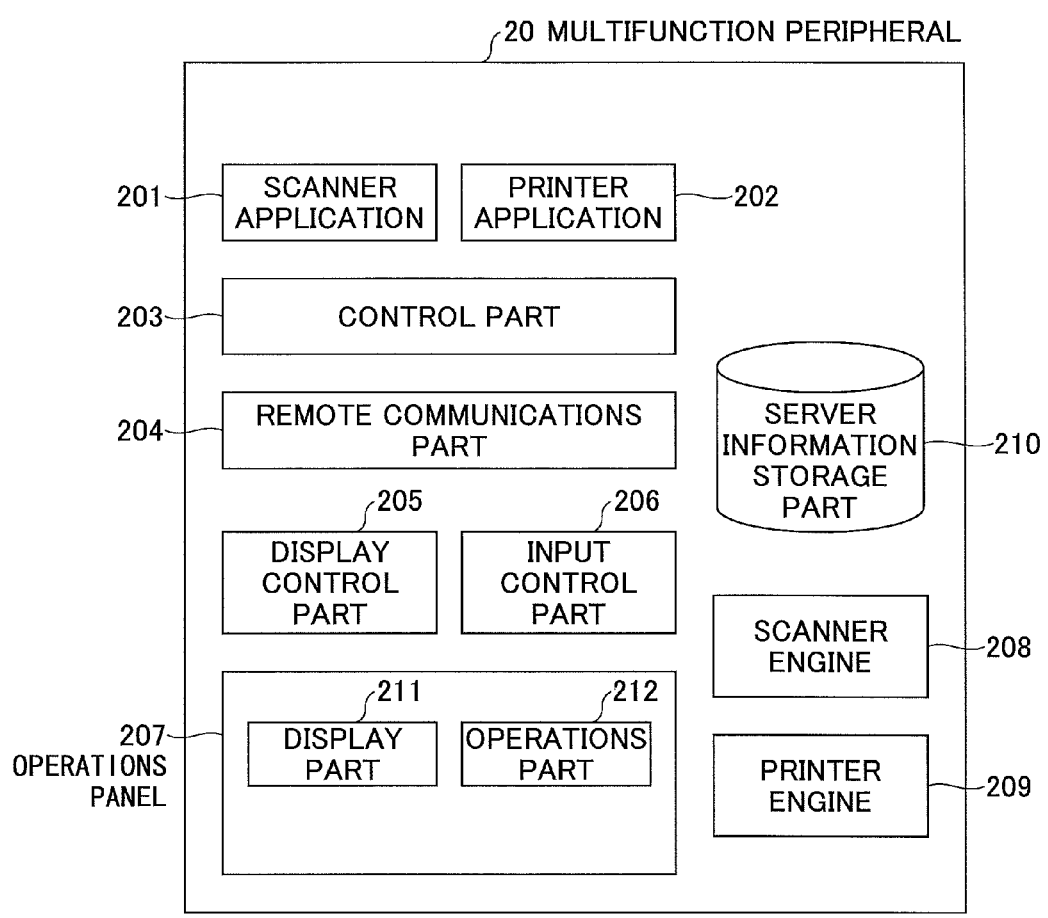
FIG. 7 is a diagram illustrating a functional configuration of a multifunction peripheral according to an embodiment.

Next, a description is given in more detail of the multifunction peripheral 20. FIG. 7 is a diagram illustrating a functional configuration of a multifunction peripheral according to an embodiment. Referring to FIG. 7, the multifunction peripheral 20 includes a scanner application 201, a printer application 202, a control part 203, a remote communications part 204, a display control part 205, an input control part 206, an operations panel 207, a scanner engine 208, a printer engine 209, and a server information storage part 210.

The server information storage part 210 stores information such as the IP address of the distribution management server 10. The server information storage part 210 may be implemented using a secondary storage device of the multifunction peripheral 20, for example.

The scanner engine 208 is a hardware item that executes scanning. The printer engine 209 is a hardware item that executes printing. The operations panel 207 includes a display part 211 and an operations part 212. The display part 211 is, for example, a liquid crystal panel, and displays a screen. The operations part 212 is formed of various types of buttons or a touchscreen provided on a liquid crystal panel, and receives a user's input.

The control part 203 controls hardware items such as the scanner engine 208, the printer engine 209, a secondary storage device (not illustrated), and a memory (not illustrated) in response to requests from applications such as the scanner application 201 and the printer application 202.

The remote communications part 204 controls communications with the distribution management server 10. The display control part 205 controls the display of a screen with respect to the display part 211. For example, the display control part 205 causes a screen based on the screen definition data received by the remote communications part 204 to be displayed on the display part 211.

The input control part 206 controls a process corresponding to a user's input detected by the operations part 212. The input control part 206, for example, notifies the scanner application 201 of the inputting of an instruction to execute scanning.

The scanner application 201 sets up scanning conditions or executes scanning in response to a notification from the operations part 212. For example, the scanner application 201 causes the scanner engine 208 to operate and scan an original material such as a document by making a request for scanning to the control part 203.

The printer application 202 executes printing. For example, the printer application 202 causes the printer engine 209 to operate by making a request for printing to the control part 203 in response to the reception of print data.

While the scanner application 201 and the printer application 202 alone are illustrated as applications in FIG. 7, the multifunction peripheral 20 may further include a copier application that executes copying and/or a facsimile application that performs facsimile transmission and reception. Furthermore, according to this embodiment, the printer application 202 may be omitted from the multifunction peripheral 20.

Figure 8:
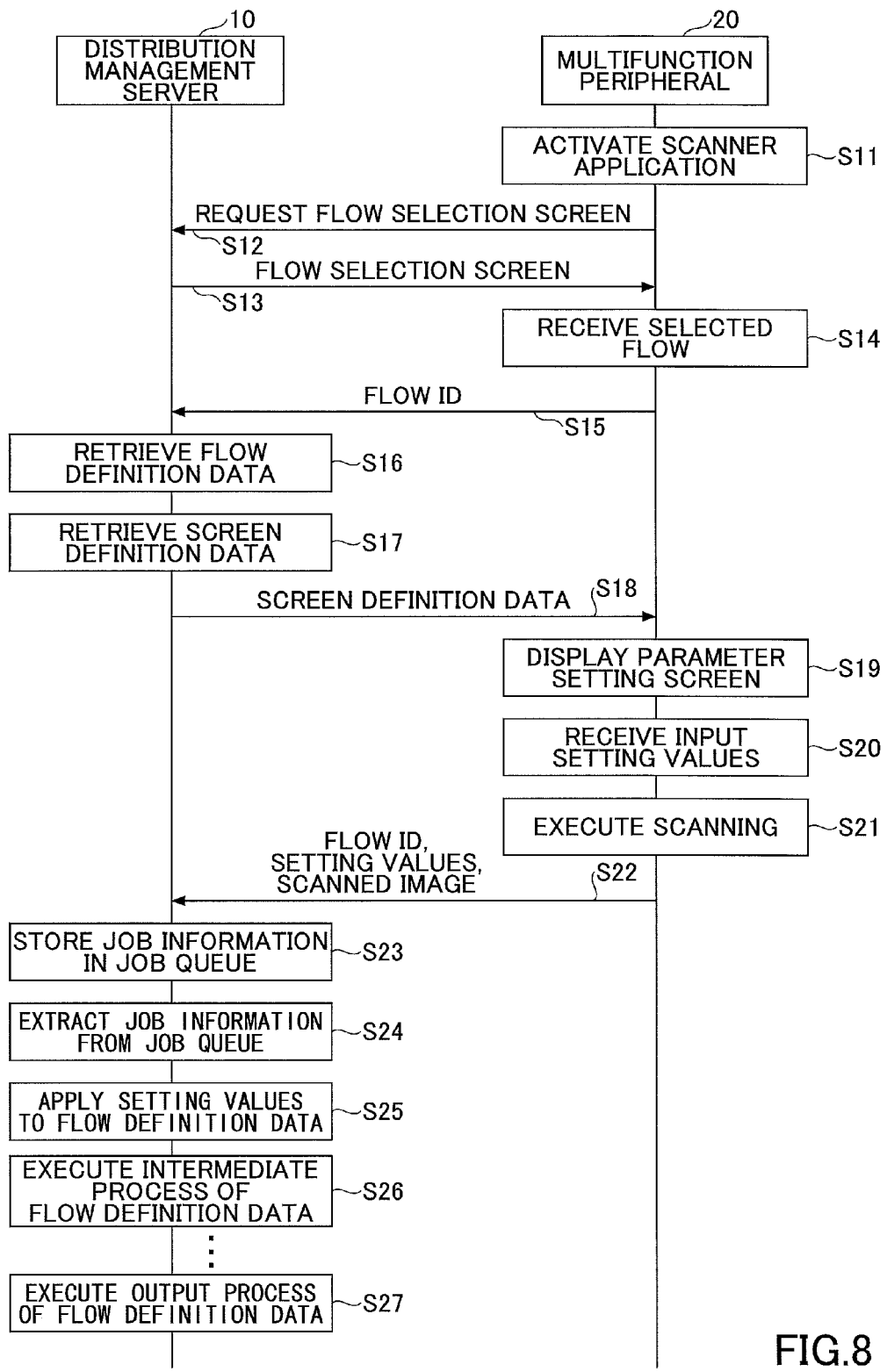
FIG. 8 is a sequence diagram for illustrating a process procedure at the time of execution of a workflow.

A description is given below of a process procedure executed in the distribution management system 1. FIG. 8 is a sequence diagram for illustrating a process procedure at the time of execution of a workflow.

Referring to FIG. 8 as well as FIGS. 3 and 7, when a SCAN button forming the operations part 212 of the operations panel 207 is depressed by a user operating the multifunction peripheral 20, at step S11, the multifunction peripheral 20 causes the scanner application 201 to be activated. In response to the activation, at step S12, the scanner application 201 requests the distribution management server 10, through the remote communications part 204, to transmit a flow selection screen. The flow selection screen is a screen for selecting a workflow to be executed from among multiple defined workflows. The transmission destination of the request is specified based on information stored in the server information storage part 210.

In response to the reception of the request for transmission of the flow selection screen, at step S13, the screen provision part 11 of the distribution management server 10 transmits the screen data of the flow selection screen to the multifunction peripheral 20. The screen data are generated based on the flow definition data stored in the flow definition storage part 16. That is, the screen data are generated so that workflows corresponding to the individual items of the flow definition data are made options.

In response to the reception of the screen data by the remote communications part 204 of the multifunction peripheral 20, the display control part 205 causes the flow selection screen to be displayed on the display part 211 of the operations panel 207 based on the screen data.

Figure 9:
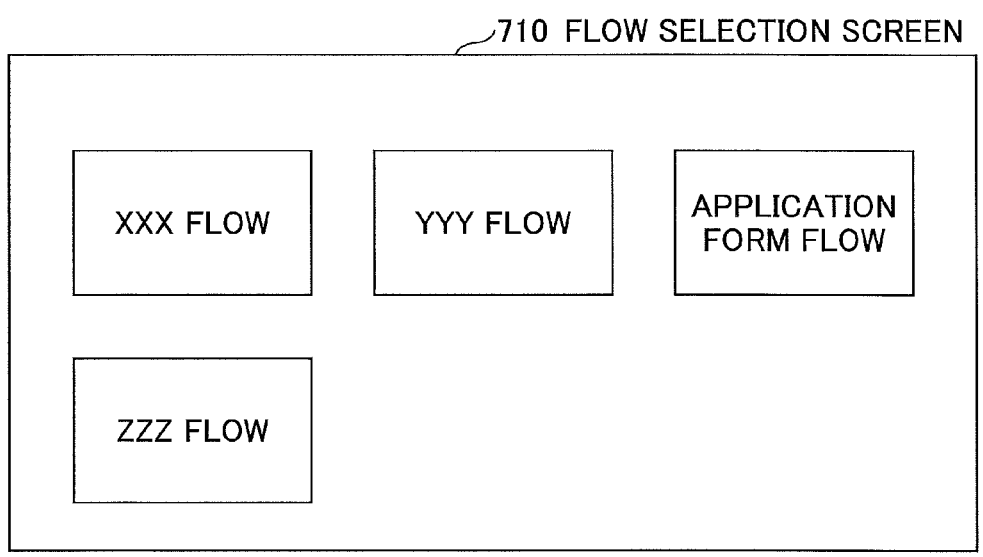
FIG. 9 is a diagram illustrating an example display of a flow selection screen.

FIG. 9 is a diagram illustrating an example display of a flow selection screen. Referring to FIG. 9, a flow selection screen 710 includes a button for each workflow (each item of the flow definition data). Each button is correlated with the flow ID of a corresponding workflow.

At step S14, the input control part 206 detects the depression of one of the buttons on the flow selection screen 710. Then, at step S15, the remote communications part 204 transmits the flow ID correlated with the depressed button to the distribution management server 10.

In the distribution management server 10, in response to the reception of the flow ID by the screen provision part 11, at step S16, the flow execution control part 13 retrieves flow definition data pertaining to the flow ID (hereinafter referred to as "object flow definition data") from the flow definition storage part 16. Then, the flow execution control part 13 determines whether screen definition data are correlated with the retrieved object flow definition data. The presence or absence of the correlation of screen definition data and the correlated screen definition data may be determined by referring to the <LinkedPropertyScreen> element of the object flow definition data. That is, if the element is included in the object flow definition data, it is determined that screen definition data are correlated with the object flow definition data. Furthermore, it is determined that the value of the element is the identification information of the screen definition data correlated with the object flow definition data. Like the object flow definition data, the screen definition data may be described in either XML format or other format.

If screen definition data are correlated with the object flow definition data, at step S17, the flow execution control part 13 retrieves the screen definition data from the screen definition storage part 17. Next, at step S18, the screen provision part 11 transmits the retrieved screen definition data to the multifunction peripheral 20.

The screen definition data are received by the remote communications part 204 of the multifunction peripheral 20. At step S19, the display control part 205 causes a screen for inputting the setting values of parameters for the workflow (hereinafter referred to as "parameter setting screen") to be displayed on the display part 211 of the operations panel 207 based on the screen definition data. The parameters may differ from workflow to workflow. For example, the address information of a distribution destination may be a parameter. With respect to a workflow that distributes data to a specific distribution destination, however, the address information of a distribution destination may be fixedly described in the object flow definition data.

At step S20, the input control part 206 receives a user's input of setting values for parameters through the parameter setting screen. According to this embodiment, when the application form flow is selected as an object of execution, a parameter setting screen corresponding to the application form flow is displayed. On the parameter setting screen, the CMIS-compliant servers 50 corresponding to the three <Destination> elements 411 through 413 included in the <Parameters> element 410 related to the CMIS distribution process of the flow definition data of the application form flow are displayed as candidate distribution destinations. In the initial state, the CMIS-compliant server 50a corresponding to the <Destination> element 411 whose "selected" attribute value is "true" is selected. A user may select one or more of the CMIS-compliant servers 50 as distribution destinations through the parameter setting screen. That is, two or more of the CMIS-compliant servers 50 may be determined as distribution destinations. Furthermore, setting values are also input through the parameter setting screen with respect to other items parameterized in the flow definition data.

Next, at step S21, the scanner application 201 causes the scanner engine 208, through the control part 203, to operate and scan an original material set by a user. Next, at step S22, the remote communications part 204 transmits, to the distribution management server 10, the flow ID selected at step S14, the scanned image data (hereinafter referred to as "scanned image"), and the setting values on the parameter setting screen.

In the distribution management server 10, in response to the reception of the flow ID, the scanned image, and the setting values by the job input part 12, at step S23, the job input part 12 stores job information including the received flow ID, scanned image and setting values in the job queue 15.

The flow execution control part 13, for example, periodically refers to the job queue 15, and if job information is stored in the job queue 15, at step S24, the flow execution control part 13 extracts the job information from the job queue 15. Next, at step S25, the flow execution control part 13 applies the setting values included in the job information to a duplicate of the object flow definition data. The object flow definition data may be identified by the flow ID included in the job information.

At step S25, for example, parts of the elements 420, 430 and 440 delimited by braces ({ }) in FIG. 5 are replaced by the setting values. Furthermore, of the <Destination> elements included in the <Parameters> element 410, a <Destination> element selected as a distribution destination has the value of its "selected" attribute set to "true" and a <Destination> element not selected as a distribution destination has the value of its "selected" attribute set to "false". Although an object of processing is a duplicate of the object flow definition data, the duplicate is referred to as "object flow definition data" for convenience of description.

Next, the flow execution control part 13 controls the execution of the workflow with respect to the scanned image included in the job information based on the object flow definition data to which the setting values are applied. Specifically, if an intermediate process is defined in the object flow definition data, at step S26, the flow execution control part 13 causes the processing part 14 corresponding to a <Plugin> element pertaining to the intermediate process to execute the intermediate process. Furthermore, at step S27, the flow execution control part 13 causes the processing part 14 to execute an output process defined in the object flow definition data.

To be more specific, the received scanned image is input to the processing part A (FIG. 3) pertaining to the first unit of processing in the execution order defined in the object flow definition data. If the first unit of processing is followed by another unit of process that is in serial order relation to the first unit of processing, the flow execution control part 13 inputs data output as a result of processing by the process part A to the processing part B (FIG. 3) pertaining to the other unit of processing. Parameters for each unit of processing are specified based on <Parameters> elements in a <Plugin> element corresponding to the unit of processing. As a result, the units of processing are executed in the order as defined in the object flow definition data. Furthermore, data are distributed to the file server 30, the SMTP server 40, or one or more of the CMIS-compliant servers 50 by the output process.

When the application form flow is to be executed, as one of the output processes, the CMIS distribution part 141 (FIG. 3) executes the CMIS distribution process. Accordingly, data are distributed to one or more of the CMIS-compliant servers 50.

Figure 10:
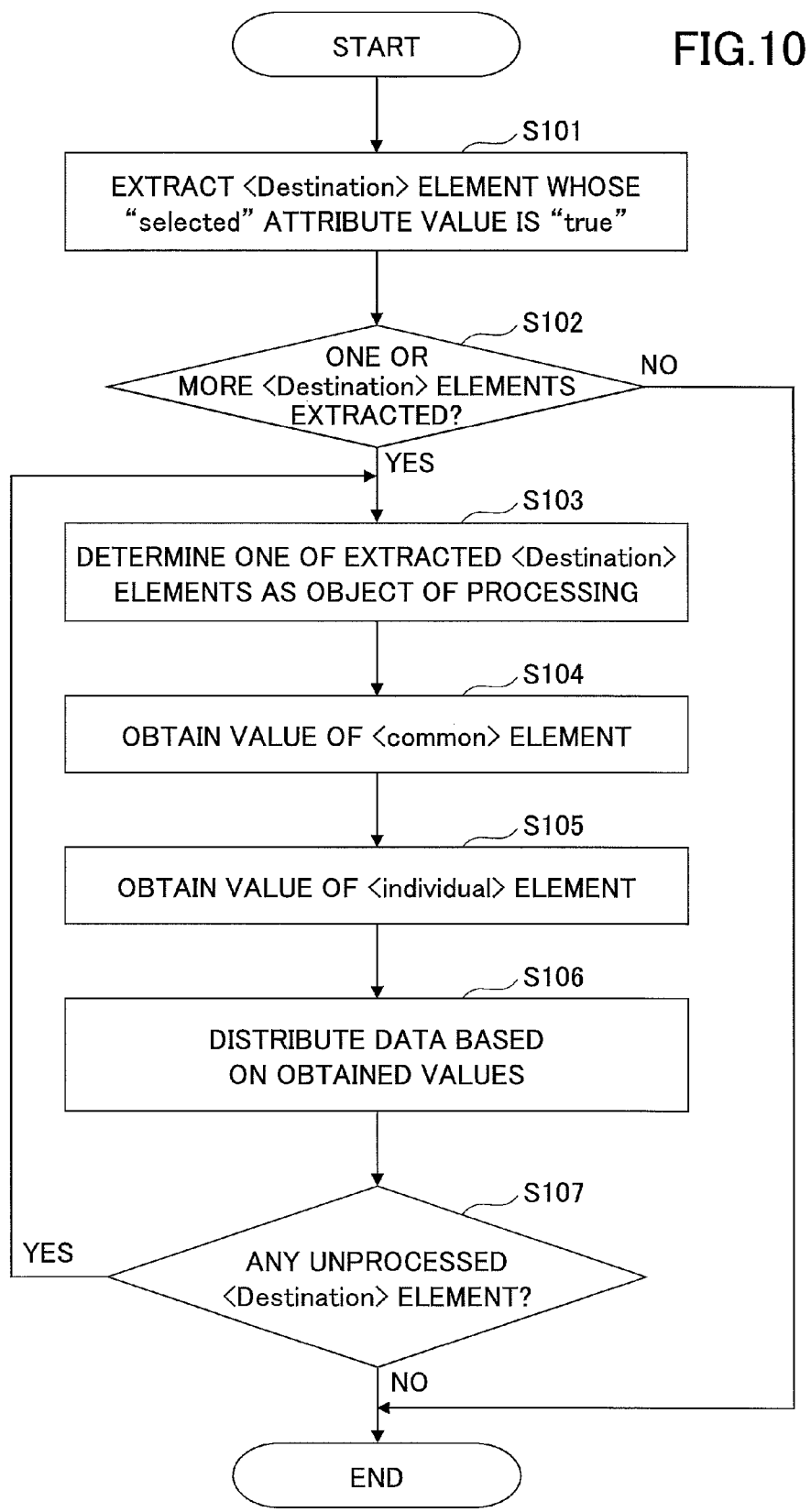
FIG. 10 is a flowchart for illustrating a process procedure for the CMIS distribution process.

Next, a description is given in more detail of the CMIS distribution process. FIG. 10 is a flowchart for illustrating a process procedure for the CMIS distribution process.

Referring to FIG. 10 as well as FIGS. 5 and 6, at step S101, the CMIS distribution part 141 extracts a <Destination> element whose "selected" attribute value is "true" from the <Parameters> element 410 included in the <Plugin> element to which the <PluginID> element whose value is "ToCMIS" belongs in the object flow definition data.

At step S102, the CMIS distribution part 141 determines whether at least one <Destination> element is extracted. If no <Destination> element is extracted (NO at step S102), the CMIS distribution part 141 ends the process of FIG. 10. If one or more <Destination> elements are extracted (YES at step S102), at step S103, the CMIS distribution part 141 determines one of the extracted one or more <Destination> elements as an object of processing. Hereinafter, the <Destination> element determined as an object of processing is referred to as "object distribution destination element."

Next, at step S104, the CMIS distribution part 141 obtains the value (the contents of the definition) of a <common> element that is a child element of the object distribution destination element. Hereinafter, the obtained value is referred to as "common item information." Next, at step S105, the CMIS distribution part 141 obtains the value (the contents of the definition) of an <individual> element that is a child element of the object distribution destination element. Hereinafter, the obtained value is referred to as "individual item information."

Next, at step S106, the CMIS distribution part 141 executes the distribution of data to the CMIS-compliant server 50 corresponding to the object distribution destination element based on the common item information and the individual item information. Basically, the CMIS-compliant server 50 is identified and communications with the CMIS-compliant server 50 are established based on the common item information. Furthermore, based on the individual item information, data are distributed in accordance with a data management system in the CMIS-compliant server 50 corresponding to the object distribution destination element. For example, according to the <individual> element in the <Destination> element 411 of FIG. 6, the data to be distributed are recorded as data classified as an application form, and a creator, a submission destination (of the application form) (To), a date of creation, etc., are recorded with respect to the data.

Next, at step S107, the CMIS distribution part 141 determines whether there is an unprocessed <Destination> element among the <Destination> elements extracted at step S101. If there is an unprocessed <Destination> element (YES at step S107), step S103 and the subsequent steps are executed with respect to the unprocessed <Destination> element. If all the extracted <Destination> elements are processed (NO at step S107), the process of FIG. 10 ends.

Thus, when a distribution destination included in multiple distribution destinations to which a communications protocol for data distribution is common is specified, the CMIS distribution part 141 executes a distribution process based on information indicating a distribution method with respect to the distribution destination defined in the flow definition data. That is, for the CMIS distribution part 141, the distribution destination and the distribution method are dynamically determined (at the time of execution) based on the flow definition data. Accordingly, it is possible to implement the distribution of data to various types of CMIS-compliant servers 50 with a single CMIS distribution plug-in, depending on the definition of the flow definition data. As a result, it is possible to reduce operational load in accommodating multiple distribution destinations.

Furthermore, because it is possible to accommodate multiple distribution destinations with a single CMIS distribution plug-in, it is possible to simplify the definition of a workflow that requires distribution of data to multiple distribution destinations. For example, if there are different output plug-ins for different distribution destinations, it would be necessary for the image conversion process to be followed by multiple distribution processes in the case of the application form flow illustrated in FIG. 4. On the other hand, according to this embodiment, it is possible to define distribution of data to multiple distribution destinations by a single CMIS distribution process as illustrated in FIG. 4.

Furthermore, this embodiment may be implemented in accordance with specifications that allow the interoperation of multiple document management servers (that is, specifications that provide multiple document management servers with a common interface) other than CMIS. In this case, the CMIS-related part of this embodiment may be replaced in accordance with the other specifications.

Figure 11:
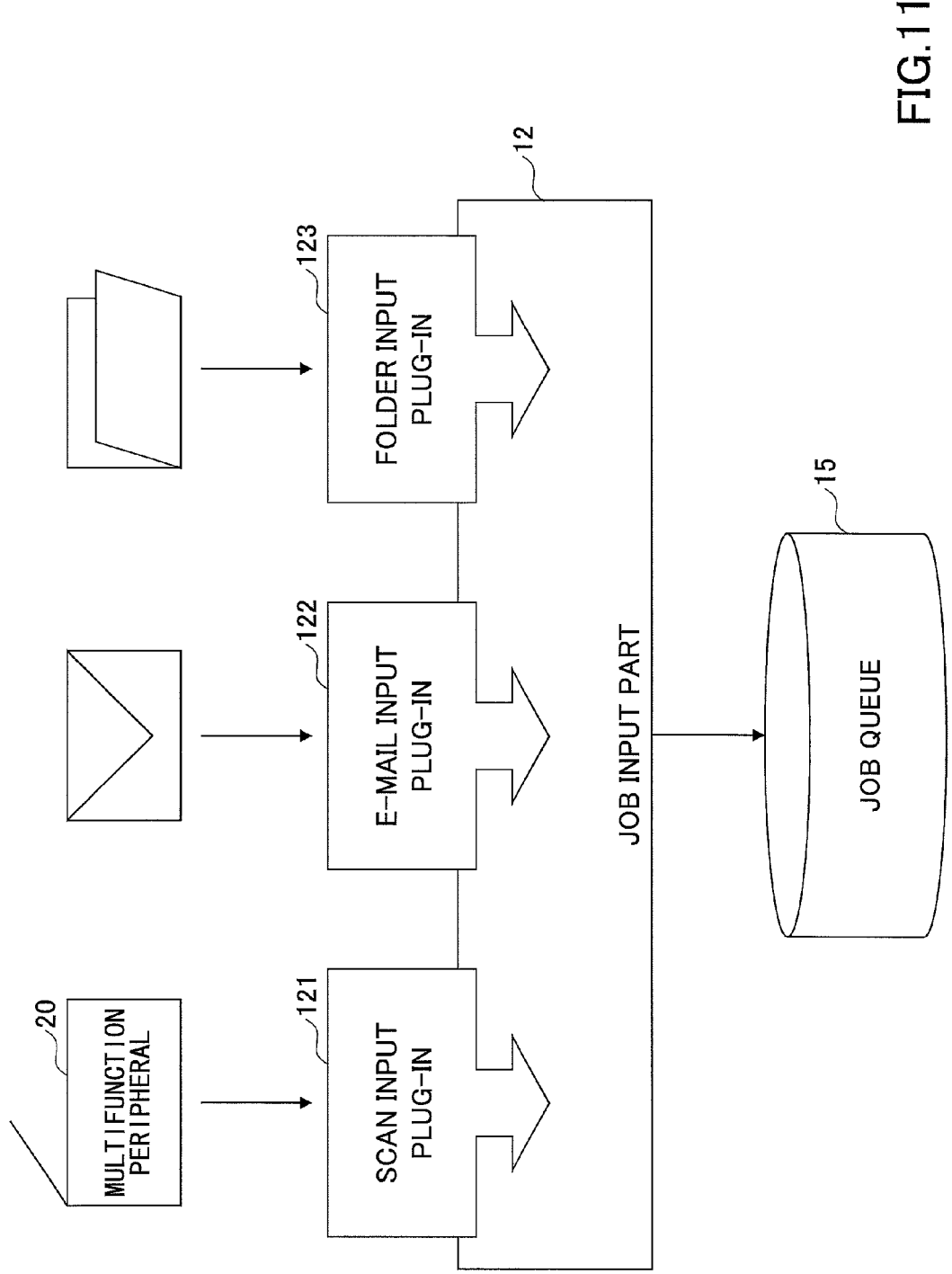
FIG. 11 is a diagram illustrating a configuration of a job input part.

Next, a description is given in more detail of the job input part 12 (FIG. 3). FIG. 11 is a diagram illustrating a configuration of a job input part. According to the job input part 12 of this embodiment, a data input source with respect to a workflow (a requestor of execution of a workflow) may be other than the multifunction peripheral 20 or a scanner.

For example, in the job input part 12, communications with a data input source are implemented by a plug-in. By way of example, FIG. 11 illustrates a scan input plug-in 121, an e-mail input plug-in 122, and a folder input plug-in 123.

The scan input plug-in 121 receives a request for execution of a workflow from the multifunction peripheral 20. That is, the scan input plug-in 121 receives a request for execution of a workflow at step S22 of FIG. 8. The scan input plug-in 121 formats the received flow ID, scanned image, and setting values into job information according to the format predetermined by the flow execution control part 13, and stores the job information in the job queue 15.

The e-mail input plug-in 122 receives a request for execution of a workflow by e-mail to which image data are attached. In this case, the image data are to be processed by the workflow. A flow ID and setting values may be described in the e-mail. The e-mail input plug-in 122 formats the image data attached to the e-mail and information described in the e-mail into job information according to the format predetermined by the flow execution control part 13, and stores the job information in the job queue 15.

The folder input plug-in 123 receives a request for execution of a workflow by the uploading of image data to a predetermined folder. The predetermined folder may be formed either in the secondary storage device 102 of the distribution management server 10 or in a storage device connected to the distribution management server 10 via a network. For example, the folder input plug-in 123 polls the predetermined folder, and if image data and a file containing a flow ID and setting values are stored in the folder, the folder input plug-in 123 obtains the image data and the file. The folder input plug-in 123 formats the obtained image data and the information stored in the obtained file into job information according to the format predetermined by the flow execution control part 13, and stores the job information in the job queue 15.

Thus, the job input part 12 may receive a request for execution of a workflow in various forms. Accordingly, it is possible to execute a workflow with respect to, for example, image data captured with a cellular phone, a smartphone, or a digital camera by transmitting the image data by e-mail or uploading the image data to a predetermined folder.

Furthermore, a request for execution of a workflow may be received in other forms by adding other plug-ins. For example, a plug-in that receives a request for execution of a workflow via a Web page may be added.

In this embodiment, the distribution management server 10 is an example of a distribution apparatus. The contents of the definition of flow definition data are an example of a process definition. The job input part 12 is an example of a reception part. The CMIS distribution part 141 is an example of a distribution part.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired hardware resources including, for example, a central processing unit (CPU), a random access memory (RAM), and a hard disk drive (HDD). The CPU may include processors of any desired kinds and numbers. The RAM may include any desired volatile or nonvolatile memories. The HDD may include any desired nonvolatile memories capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

What is claimed is:

1. A distribution apparatus, comprising:
a memory; and
a processor coupled to the memory, and configured to implement
a reception part configured to receive first data including image data and a request for execution of a process according to a process definition formed of one or more units of processing with respect to the first data, format the first data including the image data into job information according to the process definition, and store the job information;
a control part configured to control the execution of the process based on the stored job information; and
one or more processing parts each configured to execute a corresponding one of the one or more units of processing,
wherein at least one of the one or more processing parts is a distribution part configured to electronically distribute, to a distribution destination specified in the process definition, the first data or second data output as a result of execution of a first one of the one or more units of processing executed before a second one of the one or more units of processing corresponding to the at least one of the one or more processing parts,
wherein the distribution part is configured to electronically distribute the first data or the second data based on information indicating a distribution method for the specified distribution destination defined in the process definition, when the specified distribution destination is included in a plurality of distribution destinations to which a communications protocol for data distribution is common,
wherein the information indicating the distribution method includes an item common to the plurality of distribution destinations and an item that differs between the plurality of distribution destinations, and
wherein the distribution part is configured to electronically transmit the first data or the second data in accordance with a data management system of each of the plurality of distribution destinations indicated by the item that differs between the plurality of distribution destinations.

2. The distribution apparatus as claimed in claim 1, wherein the distribution apparatus is caused to function as the distribution part by a single program.

3. A distribution method executed in a distribution apparatus, the distribution apparatus including a memory, and a processor coupled to the memory and configured to implement a reception part, a control part, and one or more processing parts each configured to execute a corresponding one of one or more units of processing forming a process definition, the distribution method comprising:
receiving, by the reception part, first data including image data and a request for execution of a process according to the process definition with respect to the first data;
formatting, by the reception part, the first data including the image data into job information according to the process definition;
storing, by the reception part, the job information;
controlling, by the control part, the execution of the process based on the stored job information; and
electronically distributing, by at least one of the one or more processing parts, the first data or second data output as a result of execution of a first one of the one or more units of processing executed before a second one of the one or more units of processing corresponding to the at least one of the one or more processing parts, to a distribution destination specified in the process definition,
wherein said distributing electronically transmits the first data or the second data based on information indicating a distribution method for the specified distribution destination defined in the process definition, when the specified distribution destination is included in a plurality of distribution destinations to which a communications protocol for data distribution is common,
wherein the information indicating the distribution method includes an item common to the plurality of distribution destinations and an item that differs between the plurality of distribution destinations, and
wherein said distributing electronically transmits the first data or the second data in accordance with a data management system of each of the plurality of distribution destinations indicated by the item that differs between the plurality of distribution destinations.

4. The distribution method as claimed in claim 3, wherein the distribution apparatus is caused to function as said at least one of the one or more processing parts by a single program.

5. A non-transitory computer-readable recording medium having stored therein a program for causing a computer to execute a process, the process comprising:
- receiving first data including image data and a request for execution of a process according to a process definition formed of one or more units of processing with respect to the first data;
- formatting the first data including the image data into job information according to the process definition;
- storing the job information;
- controlling the execution of the process based on the stored job information;
- causing the computer to function as one or more processing parts each configured to execute a corresponding one of the one or more units of processing, wherein at least one of the one or more processing parts is a distribution part configured to electronically distribute, to a distribution destination specified in the process definition, the first data or second data output as a result of execution of a first one of the one or more units of processing executed before a second one of the one or more units of processing corresponding to the at least one of the one or more processing parts; and
- electronically distributing, by the distribution part, the first data or the second data based on information indicating a distribution method for the specified distribution destination defined in the process definition, when the specified distribution destination is included in a plurality of distribution destinations to which a communications protocol for data distribution is common, wherein the information indicating the distribution method includes an item common to the plurality of distribution destinations and an item that differs between the plurality of distribution destinations, and wherein said distributing electronically transmits the first data or the second data in accordance with a data management system of each of the plurality of distribution destinations indicated by the item that differs between the plurality of distribution destinations.

6. The non-transitory computer-readable recording medium as claimed in claim 5, wherein the computer is caused to function as the distribution part by a single plug-in included in the program.

* * * * *